United States Patent [19]

Stevens

[11] Patent Number: 4,680,465

[45] Date of Patent: Jul. 14, 1987

[54] MULTI-AXIS FORCE CONTROLLER

[75] Inventor: Curtis E. Stevens, Irvine, Calif.

[73] Assignee: Parker Hannifin Corporation, Cleveland, Ohio

[21] Appl. No.: 603,001

[22] Filed: Apr. 23, 1984

[51] Int. Cl.[4] .............................................. G01D 5/34
[52] U.S. Cl. .................................... 250/229; 318/580; 250/221
[58] Field of Search ................ 244/223, 228; 250/229, 250/234, 239, 221; 318/580, 640

[56]  References Cited

U.S. PATENT DOCUMENTS

| | | | |
|---|---|---|---|
| 2,787,746 | 4/1957 | Redmond | 318/580 |
| 2,895,086 | 7/1959 | Pettit . | |
| 3,011,739 | 12/1961 | Boyce et al. . | |
| 3,028,126 | 4/1962 | Holleman . | |
| 3,056,867 | 10/1962 | Eitel . | |
| 3,149,806 | 10/1964 | De Boy et al. . | |
| 3,167,667 | 1/1965 | Lukso . | |
| 3,304,799 | 2/1967 | Menefee . | |
| 3,454,920 | 7/1969 | Mehr . | |
| 3,523,665 | 8/1970 | Laynor, Jr. et al. . | |
| 3,580,636 | 5/1971 | Setto . | |
| 3,707,093 | 12/1972 | Worden | 74/471 X Y |
| 3,729,990 | 5/1973 | Oliver | 244/83 R X |
| 3,771,037 | 11/1973 | Bailey, Jr. | 318/580 |
| 3,811,047 | 5/1974 | Shragal . | |
| 3,814,199 | 6/1974 | Jones . | |
| 3,881,106 | 4/1975 | Pocker et al. | 250/234 |
| 3,886,361 | 5/1975 | Wester | 250/338 |
| 4,012,014 | 3/1977 | Marshall | 244/83 F |
| 4,069,720 | 1/1978 | Thor | 74/471 R |
| 4,250,378 | 2/1981 | Motton . | |

Primary Examiner—Eugene R. LaRoche
Assistant Examiner—Steven J. Mottola
Attorney, Agent, or Firm—Christopher H. Morgan

[57]  ABSTRACT

A force controller wherein lateral, axial and rotational force on a handle (10) are opposed by bending, extension, compression and torsional forces in a tubular flexure element (12) that includes lateral rings (92a . . . 92n) and longitudinal beams (96a . . . 96n−1). A translating plate (23) is controlled in accordance with the torsion and deflection of flexure element (12) to provide optical control signals from code element (56) and read head (64) for three axes of motion. Axial forces on handle (10) cause extension or compression of flexure element (12) which is linked to fin (42). Pivotal movement of fin (42) in response to such extension and compression provides optical control signals from code element (72) and read head (74) for a fourth axis of motion.

15 Claims, 4 Drawing Figures

MULTI-AXIS FORCE CONTROLLER

BACKGROUND OF THE INVENTION

1. Field of the Invention

The subject invention relates to multi-axis controllers and, more particularly, controllers that provide output signals in proportion to applied command forces.

2. Description of the Prior Art

Multi-axis controllers, such as those used to control aircraft flight control surfaces, have had a long history of development. Early aircraft control systems employed relatively complex hand and foot operated devices to control the flight surfaces. To simplify the flight controls, control systems were developed in which a single controller generated control signals in response to operator commands.

One of the earlier types of such controllers came to be known as a "position controller". Position controllers employed a variety of electrical and mechanical arrangements for coordinating the physical displacement of a single control handle with the amplitude strength and direction of control signals. Examples are shown in U.S. Pats. Nos. 3,011,739; 3,028,126; 3,056,867; 3,580,636; 3,771,037; 3,881,106; 4,012,014; and 4,069,720. Other prior art position controllers such as shown in U.S. Pats. Nos. 2,811,1047; 3,814,199; 3,886,361; and 4,250,378 attempted various schemes for utilizing optical signals to generate control signals in response to operator commands. Basically, these position controllers were light-modulating analog devices wherein the controller modulated light from a given source to provide control signals.

One problem with position controllers known in the prior art stemmed from their requirement for relatively large physical displacements of the controller handle. In a dynamic flight path, pilots typically experience disorientation due to rate and angular accelerations. This made the position controller difficult and unnatural to operate. Effective operation of the position controller demanded a high degree of coordination from the pilot and required substantial training and familiarization. Even then, under conditions of high rate and angular acceleration, the position controller was difficult to accurately and reliably manipulate.

It has been found that controllers having relatively low mechanical displacement but requiring relatively high manipulating forces were more natural for pilots to operate. Such controllers, sometimes referred to as "force controllers", provided improved control—particularly under high rate and fight path accelerations. Indeed, it was found that even with less familiarization, pilots could generally operate force controllers with greater repeatability and reliability than position controllers. Examples of force controllers are shown in U.S. Pats. Nos. 3,149,806; 3,304,799; 3,454,920; 3,523,665; and 3,729,990. Among force controllers known in the prior art were the type wherein a flexible tube generated command signals in response to lateral and torsional forces applied to the controller handle. Examples of this type of controller are shown in U.S. Pats. Nos. 2,895,086; 3,167,667; and 3,707,093.

While prior art force controllers were better suited to the needs of pilots than position controllers, the force controllers were generally limited in that they provided output signals in response to force commands in only three control axes. In some applications, such as helicopters, there was a need for a force controller that provided output signals in response to force commands in a fourth control axis.

Prior art force controllers that have included electrical position sensors such as potentiometers, inductive sensors, and piezoelectric devices have had other disadvantages. A persistent difficulty with such controllers has been accurately and reliably translating force commands into output control signals.

Another disadvantage of many prior art force controllers has been that they are analog devices that are not directly compatible with present flight control systems. For many years, flight control systems were basically mechanical systems and the controllers that were developed and used for these systems were basically analog devices. However, as flight control systems developed, digital electrical control systems supplanted the mechanical systems. Even after electrical flight control systems gained acceptance, the analog type controllers continued to be used because they had proven to be reliable and inexpensive. Usage of the analog controllers with the digital flight control systems required additional analog-to-digital converter hardware. Moreover, the analog controller introduced certain processing errors that were inherent to an analog signal.

Digital force controllers have been used in some prior art applications to avoid the additional analog-to-digital converter hardware required by the analog controllers as well as the inherent analog signal processing errors. Thus, they are generally more reliable and less expensive than analog force controllers. However, these digital force controllers have generally been designed for an "absolute" digital system wherein quantized changes in signal parameter are compared to a constant reference. As digital control systems continue to develop, "incremental" digital systems have become preferable to absolute digital systems. In "incremental" digital systems the net change in a quantized signal is maintained on a continuous basis. Incremental digital systems have the same advantages over analog systems as the absolute digital systems, but are still more reliable and less expensive to build and maintain than absolute digital systems.

Accordingly, there was a need in the prior art for a force controller that would provide control signals in response to pilot commands applied to four control axes. Preferably, the force controller would be digital and would directly interface with an incremental digital control system. In particular, an optical type incremental digital force controller would be preferred because it would be immune from electromagnetic and electrical interference.

SUMMARY OF THE INVENTION

In accordance with the subject invention, a controller provides control signals in response to lateral, rotational and axial command forces applied to a controller handle. The handle is connected to a tubular flexure element that is mounted in the controller body. These lateral and rotary command forces applied to the handle are opposed by the torsional and bending spring rates of the tubular flexure element. A translating plate contacts the flexure element and is movable in response to bending and torsion of the flexure element. A position code element and read head provide control signals in accordance with the position of the translating plate.

Axial command forces applied to the handle are opposed by the longitudinal spring rate of the flexure element. Preferably, the controller is further provided with an extension fin that is pivotally mounted to the controller body and connected to the flexure element through a mechanical linkage. The extension fin is movable in response to longitudinal extension and compression of the flexure element. A position code element and read head provide control signals in accordance with the position of the extension fin.

Also preferably, the translating plate is coupled to the flexure element by a longitudinally aligned key and groove. The key and groove provide for longitudinal movement of the flexure element in the translating plate in response to axial force commands applied to the controller handle. At the same time, the key and groove provide for rotational and translational movement of the translating plate in response to rotational and lateral force commands applied to the controller handle.

Most preferably, the position code elements and read heads are optical devices. Optical delay lines are provided for discriminating signal returns from read heads at the respective control axes. Advantageously, the position code elements are orthogonally and radially arranged on the translating plate and extension fin.

The deflection, torsion, and longitudinal extension and compression of the flexure element are proportional to the lateral, rotary, and axial forces applied to the handle. Preferably, the flexure element includes a linear array of rings are aligned on a comman longitudinal center axis. The first ring is located at one end of the flexure element and the last ring is located at the opposite end of the flexure element. Intermediate rings of the array are located between the first and last rings. The intermediate rings are connected to adjacent rings on one side by a first set of longitudinal beams and on the other side by a second set of longitudinal beams. The first set of longitudinal beams is in a regularly spaced circumferential arrangement with the beams having first angular positions on the ring at a given angular separation. The second set of longitudinal beams is also in a regularly spaced circumferential arrangement but with the beams having second angular positions on the ring at a given angular separation. The angular separation of beams in the first set is substantially equal to the angular separation of beams in the second set. The phase angle between beams in the first set at the first angular position and beams in the second set at the second angular position is substantially one-half the angular separation.

Preferably, the flexure element is of a substantially constant thickness and the longitudinal beams are integrally connected to the rings.

Other details, objects and advantages of the subject invention will become apparent as the following description of a presently preferred embodiment thereof proceeds.

BRIEF DESCRIPTION OF THE DRAWINGS

The accompanying drawings show a presently preferred embodiment of the subject invention in which.

PREFERRED EMBODIMENT OF THE INVENTION

Figure 1:
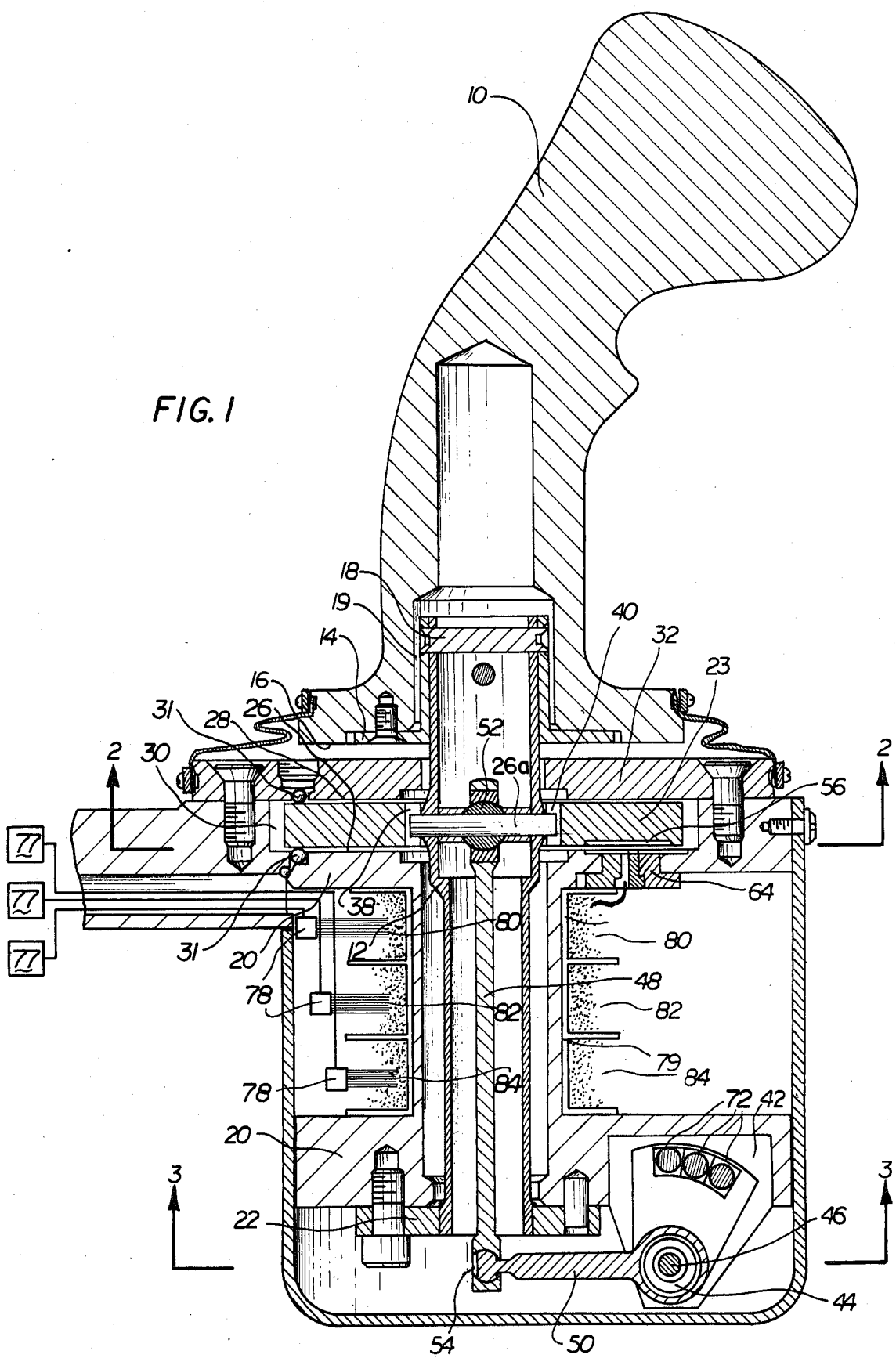
FIG. 1 is an elevation cross-section view of a controller in accordance with the subject invention.

The drawings show a presently preferred embodiment of a controller in accordance with the subject invention wherein optical control signals are provided in response to force commands applied to a handle 10. As shown in FIG. 1, handle 10 is coupled to a tubular flexure element 12 by a flange 14 that is concentrically arranged about flexure element 12. Flange 14 is secured to handle 10 and is connected to flexure element 12. Flange 14 is connected to flexure element 12 by a pin 18 that extends through aligned apertures in flexure element 12 and flange 14. Flange 14 and flexure element 12 extend into a cylindrical recess 19 of handle 10 such that the walls of recess 19 retain pin 18 in the aligned apertures.

As hereinafter more specifically explained with respect to FIG. 4, tubular flexure element 12 includes a plurality of lateral rings and longitudinal beams. The lateral rings and longitudinal beams are sized and arranged so as to permit bending, torsion, compression, and extension of flexure element 12 in accordance with selected bending, torsional, and axial spring rates. The bending, torsion, compression, and extension movements of the flexure element are in different axes. Moreover, the beams and rings are sized and arranged such that different spring rates can be independently specified depending upon the particular application. Thus, flexure member 12 can be designed with specific regard to the muscalature and strength of a human operator.

In the example of the preferred emobidment, the end of flexure element 12 adjacent handle 10 is movable with respect to body 20 in response to lateral, rotational, and axial force commands applied to handle 10. At the end of flexure element 12 that is opposite from handle 10, the flexure element is laterally and longitudinally secured to by an end plate 22. End plate 22 is fastened to controller body 20 so that the end of flexure element 12 opposite from handle 10 is laterally and longitudinally fixed to body 20.

A translating plate 23 is concentrically located on flexure element 12 such that it is responsive to lateral bending of flexure element 12 within body 20. Translating plate 23 is maintained between faces 26 and 28 of an annular cavity 30 that is formed between a circular recess in body 20 and top plate 32. The wall of flexure element 12 is thickened adjacent annular cavity 30 such that the outer surface of the flexure element abuts the inner diameter of translating plate 23. The thickened area of flexure element 12 is contoured such that the outer surface rolls on the inner diameter surface of translating plate 23 when element 12 is laterally deflected. Within the limits of annular cavity 30, translating plate 23 travels freely on bearing 31 in a plane orthogonal to the longitudinal axis of flexure element 12 in its undeflected position. Thus, flexure element 12 transmits lateral motion of handle 10 to translating plate 23.

Translating plate 23 is coupled to flexure element 12 such that it is responsive to torsion of flexure element 12 within body 28. A drive pin 26a extends through circular apertures in flexure element 12 that are longitudinally located between faces 26 and 28 of cavity 30. The ends of drive pin 29a that portrude from flexure element 12 are received in slots 38 and 40 that are located adjacent the inner radius of translating plate 23. Torsion of flexure element 12 about its longitudinal axis causes the ends of drive pin 26a to engage the sides of slots 38 and 40 and rotate translating plate 23. Thus, flexure element 12 also transmits rotational motion of handle 10 to translating plate 23. Slots 38 and 40 are aligned parallel to the axis of rotation of translating plate 23 so that drive pin 26a does not engage translating plate 23 in response to longitudinal movement of flexure element 12.

The longitudinal extension and compression of flexure element 12 controls the position of a collective control means. The collective control means shown in the preferred embodiment includes a fin 42 that is pivotally mounted on body 20 by a bearing 44 that is centered on a pin 46. Fin 42 is coupled to flexure element 12 by a control linkage that includes drive pin 26a, a rod 48 and an arm 50. Drive pin 26a is coupled to rod 48 by a ball joint 52 and rod 48 is coupled to arm 50 by a ball joint 54. Longitudinal movement of flexure element 12 at the location of drive pin 26a causes rod 48 and arm 50 to pivot fin 42 with respect to body 20. Thus, flexure element 12 transmits axial motion of handle 10 to the collective control means to cause pivotal motion of fin 42. Ball joints 52 and 54 isolate the pivotal movement of fin 42 in response to extension and compression of flexure element 12 from lateral bending and torsion of flexure element 12.

Figure 2:
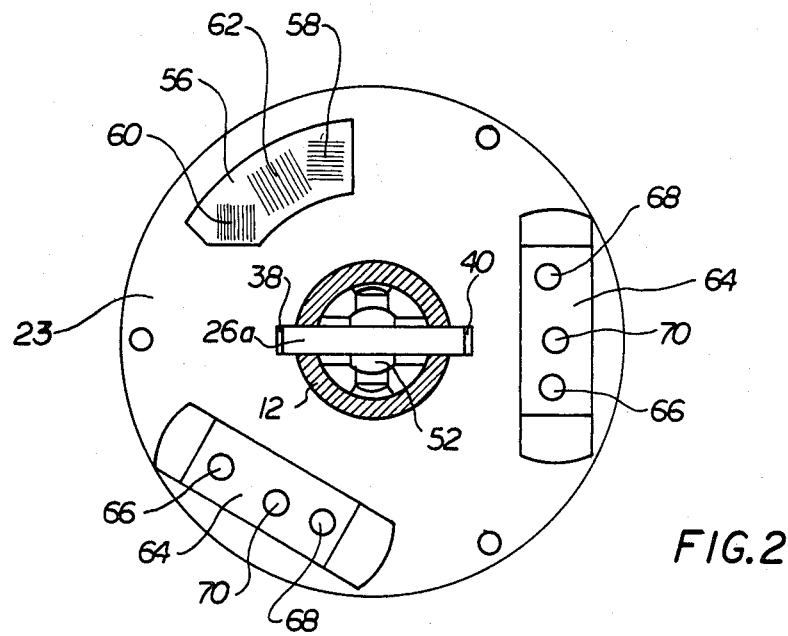
FIG. 2 is a plan cross-section of the controller of FIG. 1 taken along the lines II—II.
Figure 3:
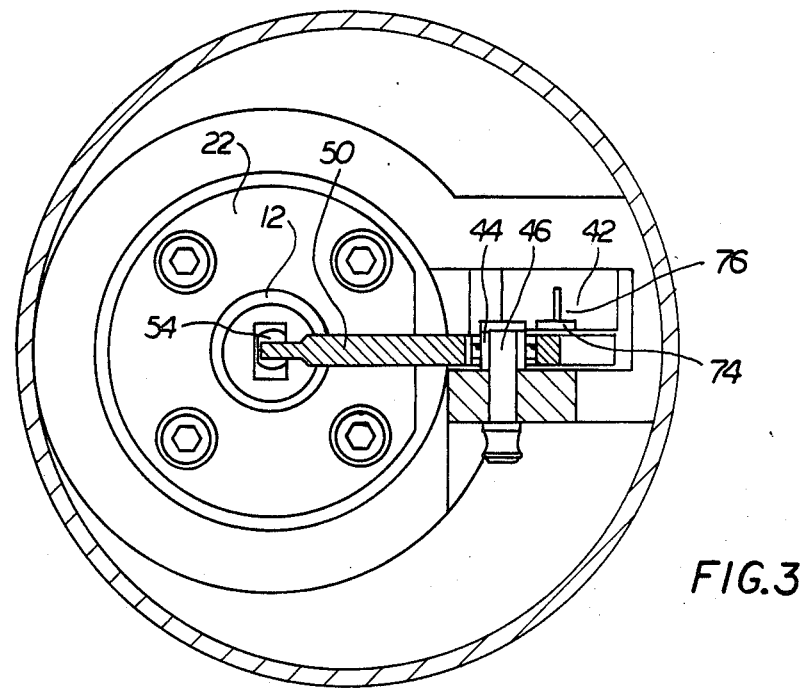
FIG. 3 is a plan cross-section of the controller of FIG. 1 taken along the lines III—III.

The subject controller can operate with various types of position sensors including electrical-type sensors. However, the preferred embodiment of the subject invention employs optical sensors to determine the position of translating plate 23 and fin 42 as controlled by the force commands applied along four control axes to handle 10 and flexure element 12. As specifically shown in FIGS. 1 and 2, translating plate 23 is provided with at least one grid code element 56. Where it is advantageous to provide redundant channels of control signals, a plurality of grid code elements are preferably provided. The example of the preferred embodiment provides for three redundant channels of control signals with three independent grid code elements 56. Each grid code element 56 is provided with three spacially arranged optical codes 58, 60 and 62. In FIG. 2 optical codes 58, and 60 are orthogonally arranged on translating plate 23 and code 62 is radially aligned on translating plate 23.

Associated with each grid code element 56 is a respective optical read head 64 that is secured to body 20. Each optical read head 64 is provided with a plurality of fiber end groups 66, 68 and 70 respectively corresponding to optical codes 58, 60 and 62 on grid code element 56. Fiber end groups 66 and 68 cooperate with optical codes 58 and 60 respectively to sense motion of translating plate 23 along the orthogonal axes. Fiber end group 70 cooperates with optical code 62 to sense rotation of translating plate 23. Thus, fiber end groups 66–70 detect motion of translating plate 23 along three axes. If greater or fewer than three control axes are required, the appropriate optical code and fiber ends are added to or omitted from grid code element 56 and optical read head 64.

The subject controller also detects the pivotal motion of fin 42 in response to force commands applied along a fourth control axis to handle 10. In a manner similar to translating plate 23, fin 42 is provided with at least one spacially arranged position code element 72. Preferably however, three code elements 72 are used to provide parallel, redundant control channels. A read head 74 corresponding to each position code element 72 is connected to body 20. Each read head, 74 includes a fiber end group 76 and is located opposite the respective code element 72 and cooperates therewith to sense pivotal movement of fin 42. Thus, fiber end group 76 detects motion of fin 42 along one axis.

Preferably, to limit the number of input and output lines to the controller for each optical channel, multiplexing techniques are applied to the input line from the optical system transmitter in accordance with the teachings of U.S. application Ser. No. 101,586 assigned to the same assignee as the subject invention and hereby specifically incorporated by reference. Briefly, an optical transmitter 77 corresponding to each control channel is linked to a respective splitter/coupler 78 inside the controller. The controller side of splitter/coupler 78 provides a sufficient number of fibers for fiber end groups 66, 68, 70 and 76.

On the transmitter side of splitter/coupler 78, the signal returns from fiber end groups 66, 68, 70 and 76 are discriminated by introducing known time delays in the respective signal returns. These time delays are accomplished by providing fibers of different lengths between splitter/coupler 78 and codes 58, 60 and 62. The fiber lengths are accommodated in the controller of FIGS. 1–4 by spool 79. Spool 79 is provided with three bobbins 80, 82 and 84 corresponding to the three isolated control channels in the preferred embodiment. If fewer or more channels are desired for a particular application, a corresponding lesser or greater number of bobbins are provided on spool 79.

Various types of optical codes as, for example, a Gray code, can be used in accordance with the subject invention. However, in the example of the preferred embodiment, the controller side of each splitter/coupler 78 provides eight fibers to each respective bobbin 80–82 Two fibers are provided to each of fiber end groups 66, 68, 70 and 76 corresponding to code elements 58, 60, 62 and 72. The interrogation rate of the optical signals from optical transmitter 77 is sufficiently rapid to exceed the mechanical rates of translating plate 23 and fin 42. The sampling returns from each pair of fibers then provides information as to the direction and sense of the movement of translating plate 23 and fin 42. The net displacement of translating plate 23 and fin 42 are determined by incrementally encoding the signal returns. Preferably, this is accomplished in a digital computer in accordance with known programming techniques. For example, where the controller is used in aircraft applications, the on-board computer is readily programmable to accomplish the incremental encoding.

Figure 4:
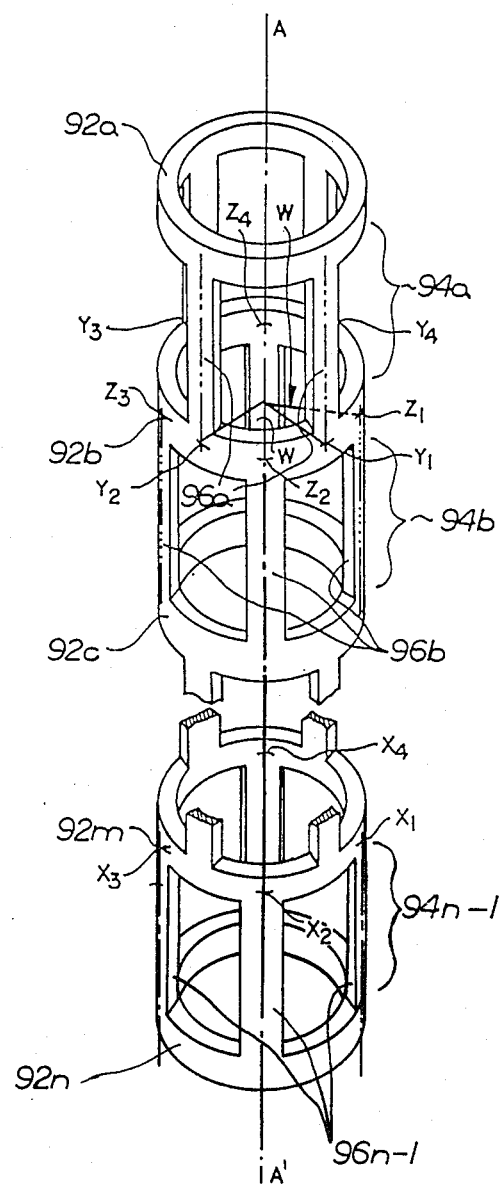
FIG. 4 is a perspective view of the flexure element included in FIGS. 1-3.

As specifically shown in FIG. 4, the preferred embodiment of tubular flexure element 12 is a generally cylindrical member that incorporates a linear array of lateral rings 92a . . . 92n that are aligned on a central longitudinal axis A–A'. The first lateral ring 92a of the array is located at one end of flexure element 12 and the lateral ring 92n is located at the opposite end of flexure element 12. A plurality of intermediate rings 92b . . . 92m are located between rings 92a and 92n and centered on longitudinal axis A–A'. Intermediate rings 92b . . . 92m are spaced apart with respect to rings 92a and 92n and with respect to each other to define sections 94a . . . 94n−1 of flexure element 12 therebetween.

Each section 94a . . . 94n−1 of flexure element 12 is provided with a respective set of longitudinal beams 96a . . . 96n−1. Although a beam set could include two or more longitudinal beams, in the preferred embodiment, each beam set contains four longitudinal beams 96a . . .

$96n-1$. Also in the preferred embodiment, rings $92a$ ... $92n$ are evenly spaced apart such that longitudinal beams $96a$ ... $96n-1$ are of equal length with opposite ends thereof connected to respectively adjacent rings $92a$-$92n$. The longitudinal beams $96a$ ... $96n-1$ of a given set are regularly spaced circumferentially around the adjacent rings $92a$ ... $92n$ with each beam defining an angular position on the ring. Thus, in a given set of longitudinal beams $96a$ ... $96n-1$, angularly adjacent beams are separated by a given, constant angle. For example, on ring $92m$ longitudinal beams $94n-1$ define positions $X_1$-$X_4$ having an angular separation of 90 degrees.

The longitudinal beams $96a$ ... $96n-1$ of a set on one side of an intermediate ring $92b$ ... $92n-1$ define first angular positions on the ring. The longitudinal beams $96a$ ... $96n-1$ of a set on the opposite side of the intermediate ring define second angular positions on the ring. The first angular positions cooperate with adjacent second angular positions to define a phase angle. For example, on ring $92b$ longitudinal beams $94a$ define first positions $Y_1$-$Y_4$ and longitudinal beams $94b$ define second positions $Z_1$-$Z_4$ with the first and second positions defining a phase angle W therebetween. In the preferred embodiment, the phase angle between the first and second angular positions is substantially one-half the angular separation between corresponding beams—namely 45 degrees. Thus, in the preferred embodiment the first positions $Y_1$-$Y_4$ and the second positions $Z_1$-$Z_4$ each define the end points of respective arcs on the intermediate ring $92b$ with the end of one arc located substantially on the radial bisector of the opposite arc.

In the flexure of element 12, the lateral rings $92a$ ... $92n$ and longitudinal beams $96a$ ... $96n-1$ distort in response to torsional, axial, and lateral forces to provide respective torsional, axial and lateral spring rates. More specifically, torsional forces produce alternate clockwise and counter-clockwise moments in the lateral rings $92a$ ... $92n$ that cause the rings to laterally deflect in sinusoidal periodic fashion. The torsional forces also cause longitudinal beams $96a$ ... $96n-1$ to bend in a tangential direction.

Axial forces on the flexure element 12 cause longitudinal beams $96a$-$96n-1$ to establish opposing shear forces in the lateral rings in a manner somewhat similar to that when torsional forces are applied. These shear forces cause the rings $92a$ ... $92n$ to laterally deflect resulting in overall extension or compression of flexure element 12 in accordance with the sense of the applied force.

Bending of flexure element 12 establishes tension between longitudinal beams $96a$ ... $96n-1$ on one side of the element and compression between longitudinal beams $96a$ ... $96n-1$ on the opposite side of element 12. On the compression side, the longitudinal beams tend to bend radially and the shear forces on the rings cause them to deflect laterally resulting in compression of the member. On the tension side, the shear forces on the rings cause them to deflect laterally resulting in overall extension of the member.

As understood by those skilled in the art, the length, width and radial thickness of the longitudinal beams $96a$ ... $96n-1$ are selected together with the diameter, width and radial thickness of lateral rings $92a$ ... $92n$ in predetermined proportions to provide independently specified torsional, lateral and axial spring rates of flexure element 12. In the preferred embodiment, the radial thickness of rings $92a$ ... $92n$ is substantially the same as the radial thickness of the longitudinal beams $96a$ ... $96n-1$. Also, the longitudinal beams are integrally connected to the rings. Thus, flexure element 12 as herein disclosed can be manufactured by cutting appropriate sections from the sidewall of a right circular cylinder. As will be apparent to those skilled in the art, the proportion of the width of the longitudinal beams to the length thereof primarily impacts the torsional and bending spring rates of the flexure element. The proportion of the width of the rings to their diameter primarily impacts the axial stiffness of the flexure element.

In the operation of the controller herein disclosed as applied, for example, to a helicopter, the controller provides optical control signals in response to command forces applied to handle 10 along four axes of motion. Urging controller handle 10 forward or backward will apply a bending moment to flexure element 12 that opposes the command force in proportion to the lateral displacement of flexure element 12. Displacement of flexure element 12 causes displacement of translating plate 23 by a corresponding amount. Returns from interrogating signals provided to optical read head 64 form optical control signals that determine the sense and magnitude of motion of translating plate 23. The helicopter flight control system interprets these signals to accomplish appropriate adjustments to the flight control surfaces are then made for helicopter pitch.

Similarly, urging controller handle 10 sideways applies a bending moment to flexure element 12 that opposes the command force in proportion to its lateral displacement. Resultant displacement of translating plate 23 is detected from returns of interrogating signals to read head 64. The helicopter flight control system interprets these signals to adjust the flight control surfaces for helicopter roll.

Rotational forces on controller handle 10 apply a torsional moment to flexure element 12 that opposes the command force in proportion to the degree of rotation. Resultant rotation of translating plate 23 is detected from the optical control signals from read head 64. These signals are then input to the helicopter flight control system which adjusts the flight control surfaces to control helicopter direction.

The collective control signals for the helicopter flight surfaces are generated in accordance with optical control signals provided in response to axial force on the control handle 10. Axial force on control handle 10 causes extension or compression of flexure element 12 which causes pivotal movement of fin 42. This movement is detected from signal returns from read head 74 and appropriate collective control signals are then provided to the helicopter flight control surfaces.

While a presently preferred embodiment of the subject invention has been shown and described, the invention is not limited thereto but may be otherwise variously embodied within the scope of the following claims.

I claim:

1. A controller that provides control signals in response to force commands, said controller comprising:
   a body;
   a flexure element having one end laterally and longitudinally fixed to said body;
   a handle secured to the end of the flexure element opposite from said body such that force commands applied to said handle are transmitted to said flexure element, a position ring concentrically arranged about said flexure element and maintained in said body, said ring being movable with respect to said body in a plane orthogonal to the longitudinal axis of the flexure element; and position sensing means connected to said body and to said position ring, said sensing means being responsive to the movement of said position ring to provide control signals.

2. A controller that provides control signals in response to force commands, said controller comprising:

a body;

a flexure element having one end laterally and longitudinally secured to said body, said flexure element being constructed to have longitudinal elasticity with respect to said body;

a handle secured to the end of said flexure element opposite from said body such that longitudinal force commands applied to said handle are transmitted to said flexure element;

longitudinal sensing apparatus connected to said flexure element and responsive to longitudinal elasticity of said flexure element; and position sensing means responsive to the movement of said longitudinal sensing apparatus.

3. A controller that provides control signals in response to force commands, said controller comprising:

a body;

a flexure element having one end secured to said body;

a handle secured to the end of said flexure element opposite from said body such that lateral, torsional and longitudinal force commands applied to said handle are transmitted to said flexure element;

a position ring concentrically arranged about said flexure element and maintained in said body, said ring being translationally and rotatably movable in a plane substantially orthogonal to the longitudinal axis of the flexure element;

longitudinal sensing apparatus connected to said flexure element and responsive to longitudinal elasticity of said flexure element; and position sensing means responsive to the translational and rotational movement of said position ring and to the longitudinal elasticity of said flexure element.

4. The controller of claim 1 or 3 wherein said position sensing means is responsive to rotational movement of said position ring.

5. The controller of claim 1 or 3 wherein said position sensing means comprises:

code means attached to said position ring; and means for reading said code means, said reading means being connected to said body and cooperating with said code means to provide control signals.

6. The controller of claim 1 or 3 wherein said position sensing means comprises:

optical code means attached to said position ring; and an optical read head connected to said body and located adjacent said code means for scanning said code means.

7. The controller of claim 1 or 3 wherein said position sensing means comprises:

optical code means attached to said position ring;

an optical read head connected to said body and located adjacent said code means for scanning said code means; and first and second means for communicating optical signals to said read head, said first and second communicating means being connected to said read head at adjacent positions for incrementally reading said code means, said first communicating means providing a signal delay in comparison to said second communicating means to discriminate respective signal returns.

8. The controller of claim 1 or 3 wherein said position sensing means comprises:

a plurality of optical code means attached to said position ring;

a plurality of optical read heads respectively corresponding to each of said optical code means; and means for selectively delaying optical signals communicated from said read heads to discriminate signal returns from the respective read heads.

9. The controller of claim 2 or 3 wherein said longitudinal sensing apparatus comprises:

a position fin that is pivotally mounted to said body, said position fin having a face in a plane that is substantially parallel to the longitudinal axis of said flexure element and a pivotal axis that is substantially orthogonal to the longitudinal axis of the flexure element; and control linkage connected to said flexure element and to said position fin, said control linkage providing pivotal motion of the position fin in response to longitudinal elasticity of the flexure element.

10. The controller of claim 9 wherein said control linkage comprises:

a rod joined at one end to said flexure element; and an arm that is connected at one end to the end of said rod opposite the flexure element, said arm being fastened at the other end to said position fin to pivot the fin in response to longitudinal elasticity of said flexure element.

11. The controller of claim 1 or 3 wherein said position ring is concentrically arranged about said flexure element, the inner radius of said position ring being provided with a groove and said flexure element being provided with a lateral pin having end portions extending from the flexure element and engaged in the groove of the position ring such that the flexure element rotates said position ring in response to torsional movement of said handle.

12. The controller of claim 3 wherein said position ring is concentrically arranged about said flexure element the inner radius of said position ring being provided with a groove and said flexure element being provided with an extension that engages the sides of the groove in response to torsional movement of said handle to rotate said position ring, said extension traveling along said groove in response to longitudinal movement of the handle.

13. The controller of claim 3 or 12 wherein said sensing means comprises:

an optical position code means; and an optical read head that scans said position code means.

14. The controller of claim 1 or 3 wherein said position sensing means comprises:

first code element arranged to indicate the movement of said position ring along one of two ordinate axis;

a second code element arranged to indicate the movement of said position ring along the other ordinate axis;

a third code element arranged to indicate the rotational movement of said position ring;

a plurality of optical read heads respectively corresponding to each of said first, second and third code elements; and means for selectively delaying optical signals communicated from said read heads to discriminate signal returns from the respective read heads.

15. The controller of claim 1 or 3 wherein said sensing means comprises:

a first code element arranged along one ordinate axis of said position ring;

a second code element arranged along the other ordinate axis of said position ring;

a third code element radially arranged on said position ring;

a fourth code element radially arranged on said fin;

a plurality of optical read heads respectively corresponding to each of said first, second, third, and fourth code elements; and means for selectively delaying opitcal signals communicated from said read heads to discriminate signal returns from the respective read heads.

* * * * *